United States Patent [19]

Dittrich et al.

[11] Patent Number: 5,001,595
[45] Date of Patent: Mar. 19, 1991

[54] CAPACITIVE PRESSURE SENSOR AND METHOD OF MANUFACTURING SAME

[76] Inventors: Gerhard Dittrich, Kieler Kamp 48, D - 2320 Ploen; Frank Hegner, Barletenweg 1, D - 7864 Maulburg; Thomas Klähn, Zasiusstrasse 81, D - 7800 Freiburg i.Br, all of Fed. Rep. of Germany

[21] Appl. No.: 498,016

[22] Filed: Mar. 23, 1990

[30] Foreign Application Priority Data

Apr. 1, 1989 [DE] Fed. Rep. of Germany ....... 3910646

[51] Int. Cl.⁵ ........................ H01G 7/00; G01L 9/12
[52] U.S. Cl. .................... 361/283; 29/25.42; 73/718
[58] Field of Search ............ 73/718, 724; 361/283, 361/321; 29/25.42

[56] References Cited

U.S. PATENT DOCUMENTS

| | | | |
|---|---|---|---|
| 3,376,376 | 4/1968 | Smith | 174/52 |
| 3,405,559 | 10/1968 | Moffatt | 73/398 |
| 3,748,571 | 7/1973 | Kurtz | 361/283 |
| 3,952,234 | 4/1976 | Birchall | 361/283 |
| 3,993,939 | 11/1976 | Slavin et al. | 361/283 |
| 4,064,550 | 12/1977 | Dias et al. | 361/283 |
| 4,177,496 | 12/1979 | Bell et al. | 361/283 |
| 4,184,189 | 1/1980 | Davis et al. | 361/283 |
| 4,388,668 | 6/1983 | Bell et al. | 361/283 |
| 4,426,673 | 1/1984 | Bell et al. | 361/283 |
| 4,490,773 | 12/1984 | Moffatt | 361/283 |
| 4,531,415 | 7/1985 | Orlowski et al. | 73/718 |
| 4,752,858 | 6/1988 | Yokotani et al. | 361/321 |

FOREIGN PATENT DOCUMENTS

| | | |
|---|---|---|
| 2021479 | 11/1971 | Fed. Rep. of Germany . |
| 2556947 | 7/1976 | Fed. Rep. of Germany . |
| 2631883 | 3/1977 | Fed. Rep. of Germany . |
| 2709945 | 9/1977 | Fed. Rep. of Germany . |
| 2715339 | 10/1978 | Fed. Rep. of Germany . |
| 2063562 | 6/1981 | United Kingdom . |
| 3041952 | 9/1981 | Fed. Rep. of Germany . |
| 3137219 | 4/1983 | Fed. Rep. of Germany . |
| 0097339 | 1/1984 | European Pat. Off. . |
| 0111348 | 6/1984 | European Pat. Off. . |
| 1540765 | 2/1979 | United Kingdom . |

Primary Examiner—Donald A. Griffin
Attorney, Agent, or Firm—Barnes & Thornburg

[57] ABSTRACT

The capacitive pressure sensor (10) has two disks (11, 12) of alumina which are joined together around the periphery in a defined spaced relationship and parallel to each other, forming a chamber (14). At least one of the two disks (11) is designed as an elastic diaphragm. A pure nickel coating (16, 18) is applied to the surface of each disk by electroless deposition from an aqueous solution, and on the surfaces of the two disks facing each other, capacitor electrodes (17, 20, 21) are formed by patterning the nickel coating. The capacitor electrodes are connected to an electronic circuit disposed outside the chamber (14) by additional nickel coatings which are formed in plated-through holes (30, 31, 32) simultaneously with the deposition of the pure nickel coating.

8 Claims, 3 Drawing Sheets

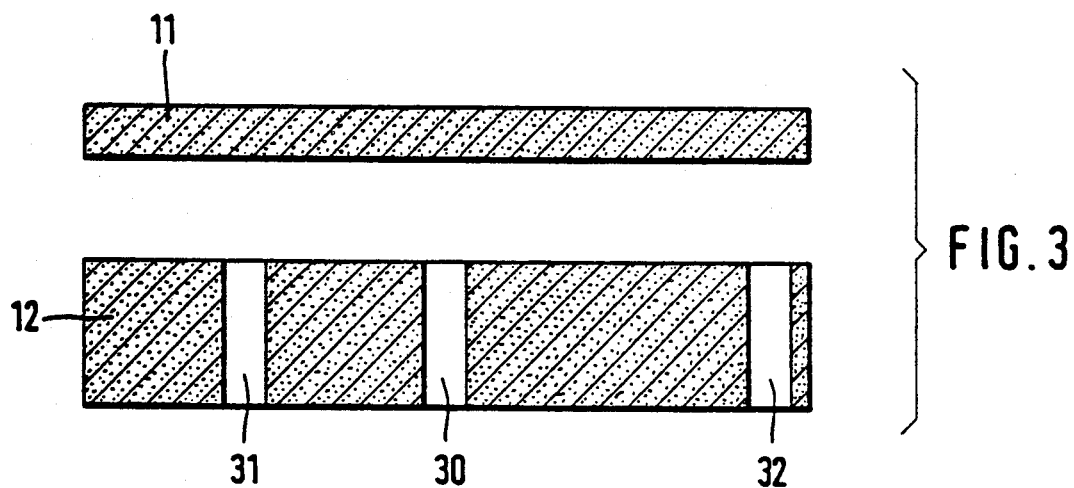
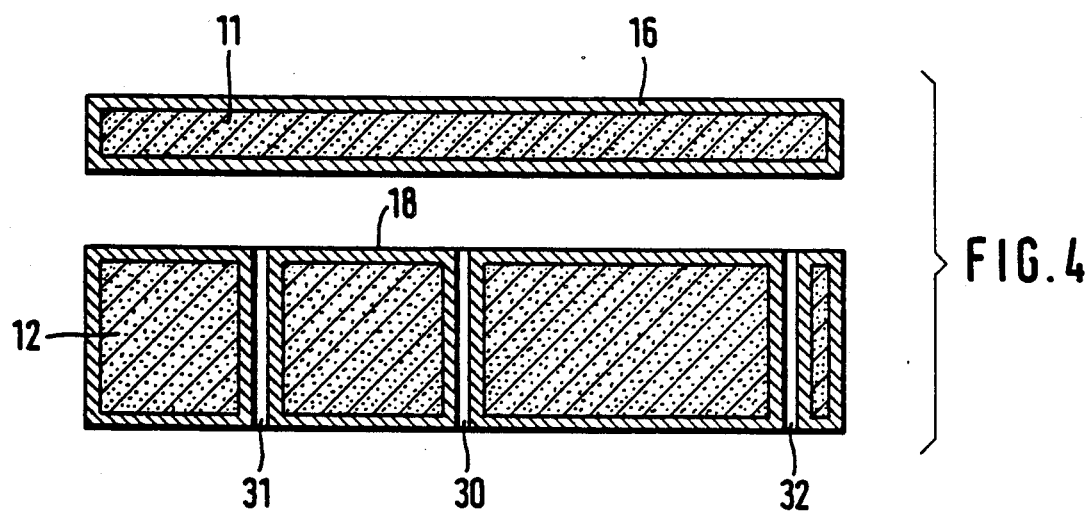

CAPACITIVE PRESSURE SENSOR AND METHOD OF MANUFACTURING SAME

The invention consists in a capacitive pressure sensor comprising two disks of alumina ceramic which are joined together around the periphery in a defined spaced relationship and parallel to each other, forming a sealed chamber; at least one of the disks is designed as an elastic diaphragm; at least one of the disks supports one or more capacitor electrodes inside the chamber on the surface facing the other disk; the surface of each of the disks is covered with a firmly adhering, pure nickel coating which is applied by electroless deposition from an aqueous solution and in which the capacitor electrodes are formed by patterning; the disks are joined together around the periphery by a solder metal which bonds the nickel coatings together, and one of the disks has at least two through holes whose walls are also covered with the nickel coating, whereby the capacitor electrodes are connected to an electronic circuit disposed outside the chamber.

The invention further consists in a method of manufacturing a pressure sensor wherein two disks are made from alumina ceramic, at least one of them being designed as an elastic diaphragm; through holes are formed in at least one of the two disks; a firmly adhering pure nickel coating is applied to the surface of each of the disks and to the walls of the through holes by electroless deposition from an aqueous solution; the nickel coatings are patterned to form capacitor electrodes and/or conductor tracks; the two disks are placed one on top of the other, with a formed part of solder metal being inserted between peripheral portions of the nickel coatings, and the assembly is heated until the solder metal melts.

DE-A-No. 27 09 945, corresponding to U.S. Pat. No. 4,177,496, 4,388,668, and 4,426,673, discloses a capacitive pressure sensor with two disks of alumina ceramic which are joined together around the periphery in a defined spaced relationship and parallel to each other, forming a sealed chamber, with at least one of the two disks designed as an elastic diaphragm, and at least one of two disks supporting one or more capacitor electrodes inside the chamber on the surface facing the other disk, which are connected by leads to an electronic circuit disposed outside the chamber.

In this prior art pressure sensor, the surfaces of the two disks facing each other have central, circular, metallized layers as capacitor electrodes from which extend conductive strips of metal to which electric leads are coupled. The two disks are bonded together around the periphery by a fused glass frit, and the leads extend through the seal provided by the glass frit.

A pressure sensor disclosed in DE-A-No. 22 21 062 is of a similar design, but it is made from glass or quartz, and its parts are shell-shaped and fused directly together at the edge, with the leads brought out through the joint. In this prior art pressure sensor, the outer surfaces of the two shell-shaped parts are additionally covered with thin metal films which serve as electrostatic shields.

The manufacture of these prior art pressure sensors is complicated and costly. Furthermore, the pressure sensors are mechanically and thermally sensitive because the connection by glass frit or by direct fusion of glass or quartz parts has only limited mechanical strength and limited thermal stability. For pressure sensors whose disks are made from very-high-purity oxide ceramics, bonding by glass frit has proved unsatisfactory. Finally, the connection of the leads, which are brought out through the edge portion, with the associated electronic circuit is complicated.

A pressure sensor disclosed in DE-A No. 31 37 219 has two disks consisting of glass, ceramics or the like. The distance of the disks is given by a glass ring inserted therebetween. The disks are joined by a sealing ring around the glass ring which can consist of a solder paste, an epoxy resin or the like. The electrodes cover only that areas of the disks which lie inside the glass ring. Therefore, the sealing ring contacts directly the disks. The rigidity of this bonding is in particular unsufficient if the disks consist of highly pure alumina ceramic. How the leads are fed through the disks is not disclosed since the leads are only shown schematically.

A pressure sensor disclosed in EP-A-No. 97 339 has electric leads built by metallised holes feeding through one of its disks. This pressure sensor consists of two disks of boro-silicate glass between which a slice of silicon is inserted having several sections of different thickness building the diaphragms. The silicon slice serves also as distance ring between the two boro-silicate glass disks with which it is directly contacted, but it is not mentioned how this connection is made.

A pressure sensor disclosed in U.S. Pat. No. 3,952,234 has a rigid disk of ceramics and the other disk serving as elastic diaphragm is the front wall of a metallic casing. The front wall is covered by an alumina ceramics sheet on its side facing the rigid disk. The capacitor electrodes are printed on to the ceramics areas or deposited galvanically thereon and consist of gold or silver. The problem of bonding both disks does not exist with this pre-described pressure sensor since its rigid disk is inserted into the metallic case and is fastened by a sealing ring pressing against a ring-shaped shoulder of said case serving as distance ring.

It is the object of the invention to provide a pressure sensor which is easy to manufacture at low cost and has very good mechanical, thermal, and electrical properties.

The invention makes use of the fact that methods are known whereby very firmly adhering nickel coatings can be applied to the surfaces of alumina-ceramic parts by electroless deposition, i.e., in a very simple and economical manner which is especially suited to mass production.

In the pressure sensor according to the invention, the nickel coatings, which are deposited in a single operation, perform a number of functions which, on the one hand, give very good mechanical, thermal, and electrical properties of the pressure sensor and, on the other hand, allow simple and economical manufacture of the pressure sensor. The nickel coatings deposited on the outer surfaces of the disks can act directly as electrostatic shields. The capacitor electrodes, which are located within the chamber, can be formed by patterning the same nickel coatings using, e.g., photolithogrpahic techniques as are employed for the fabrication of microelectronic circuits. In similar fashion, conductor tracks of the associated electronic circuit can be formed directly on an outer surface of the pressure sensor by patterning the nickel coatings. Electrical connection to the capacitor electrodes is made by metallizing, i.e., nickel-plating, through holes in the disk supporting the capacitor electrodes simultaneously with the deposition of the nickel coatings. Finally, the nickel coatings make it possible to achieve a particularly good and strong mechanical and thermal bond between the two plates by soldering using a solder metal which also serves as a spacer.

Further advantageous aspects and developments of the pressure sensor according to the invention and of the method of manufacturing same are defined in the subclaims.

Further features and advantages of the invention will become apparent from the following description of an embodiment taken in conjunction with the accompanying drawings, in which:

FIGS. 3 to 6 show parts of the pressure sensor of FIGS. 1 and 2 in various stages of its manufacture.

Figure 1:
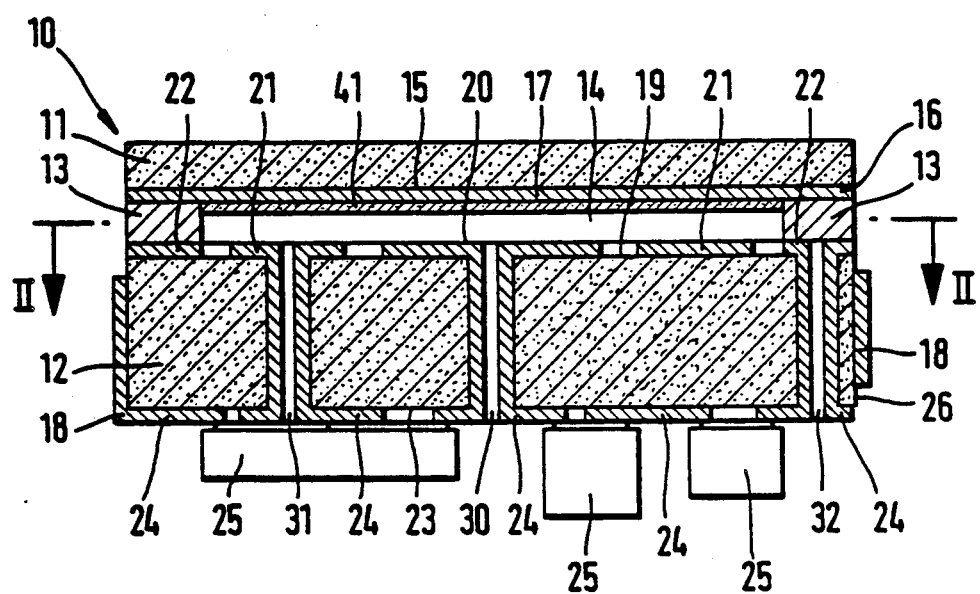
FIG. 1 is a longitudinal section through a pressure sensor in accordance with the invention.
Figure 2:
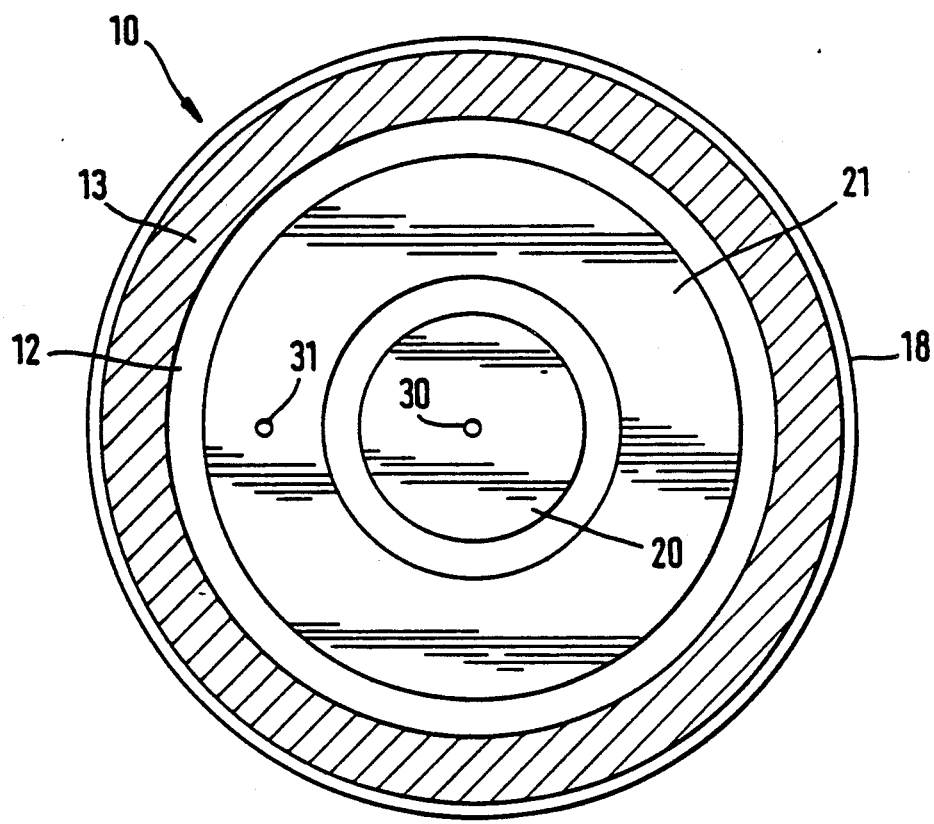
FIG. 2 is a cross section taken along line II—II of FIG. 1.

The pressure sensor 10 shown in FIGS. 1 and 2 has two disks 11, 12 of ceramic which are joined together in a defined spaced relationship by a joining material 13 extending around the periphery, thus forming a chamber 14 between the opposite parallel surfaces of the two disks. The disk 12 is relatively thick, so that it forms a rigid substrate, while the disk 11 is relatively thin and elastic, so that it acts as a diaphragm which can deform when external pressure is applied to it. The disks 11 and 12 are made of alumina ceramic ($Al_2O_3$).

The surface 15 of the disk 11 facing the chamber 14 is completely covered with a thin, firmly adhering, pure nickel coating 16, which forms a capacitor electrode 17. A thin, firmly adhering, pure nickel coating 18 is also deposited on all surfaces of the plate 12. On the surface 19 facing the chamber 14, the nickel coating 18 is patterned in such a way as to be divided into a central, circular capacitor electrode 20, an annular capacitor electrode 21 surrounding the latter at a distance therefrom, and an annular edge portion 22. These portions are electrically isolated from each other.

On the surface 23 of the disk 12 facing away from the chamber 14, the nickel coating 18 is also patterned to form conductor tracks 24. The conductor tracks 24 may serve to establish the necessary electrical connections between the pressure sensor 10 and an electronic circuit, or, as indicated in FIG. 1, they may directly form the conductors of an electronic circuit whose components 25 are placed on the conductor tracks 24.

The portion of the nickel coating 18 deposited on the lateral surface 26 of the disk 12 serves as an electrostatic shield. During operation of the pressure sensor, it is connected to a suitable potential, usually ground. Therefore, this portion of the nickel coating 18 is patterned to interrupt undesired electrical connections.

In the case of the pressure sensor being described, whose disks 11 and 12 are of alumina, the nickel coatings 16 and 18 are applied to the surfaces of the disks 11, 12 by conventional electroless deposition.

Since the edge regions of the two disks 11, 12 are metallized, the joining material is a solder metal 13 which is chosen to form as strong and tight a soldered joint as possible. The melting point of the solder metal 13 must, of course, be below the melting point of the nickel coatings; a suitable solder is, for example, a silvercopper brazing alloy.

To electrically connect the capacitor electrodes 17, 20, 21 to the conductor tracks 24, the disk 12 has through holes 30, 31, 32 whose walls were plated with nickel during the deposition of the nickel coatings 18. The nickel coatings deposited on the walls of the through holes 30, 31 make continuous, electrically conductive connections between the capacitor electrodes 20, 21 and the conductor tracks 24 formed on the surface 23 in the areas surrounding the through holes 30, 31. In a similar fashion, the nickel coating in the through hole 32 connects the annular edge portion 22 to one of the conductor tracks 24. Since this edge portion 22 is electrically connected to the nickel coating 16 by the solder metal 13, the capacitor electrode 17 is connected to one of the conductor tracks 24 through the nickel-plated through hole 32.

The operation of the pressure sensor 10 is known per se. When external pressure is applied to the disk 11, which acts as a diaphragm, the latter will be deflected to a degree depending on the pressure applied, so that the distance between its central portion and the central capacitor electrode 20 will change as a function of the pressure. Accordingly, the capacitance between the central capacitor electrode 20 and the opposite capacitor electrode 17 depends on the applied pressure. This capacitance is converted into an electric signal representative of the capacitance by the electronic circuit to which the capacitor electrodes 20 and 17 are connected through the nickel coatings in the through holes 30 and 32, respectively.

By contrast, the distance between the edge region of the disk 11 and the opposite annular capacitor electrode 21 changes only very little in the event of a pressure-dependent deformation, so that the capacitance between the annular capacitor electrode 21 and the opposite capacitor electrode 17 will remain essentially constant regardless of the pressure applied. This capacitance can therefore be used as a reference variable in the electronic circuit to which the annular electrode 21 is connected through the nickel coating in the through hole 31.

In the pressure sensor 10 shown in FIG. 1, the chamber 14 is sealed around the periphery by the soldered joint, but it communicates with the surrounding atmosphere via the through holes 30, 31, so that it is under atmospheric pressure. The pressure sensor 10 thus acts as a relative-pressure sensor. If the pressure sensor 10 is to be used for measuring the absolute pressure, the chamber 14 must be evacuated or hermetically sealed. This can be done by simply placing the pressure sensor 10 in a vacuum and soldering up the through holes 30, 31 therein.

An embodiment of a method of manufacturing the pressure sensor shown in FIGS. 1 and 2 will now be described with the aid of FIGS. 3 to 6.

First, as shown in FIG. 3, the two disks 11, 12 are made from alumina $Al_2O_3$ of about 96% purity. The disk 12 is provided with the through holes 30, 31, 32 where necessary. The aspect ratio of the through holes 30, 31, 32, i.e., the ratio of their length to their diameter, must be small enough to ensure uniform coating over their entire length during the subsequent nickel deposition. If the thickness of the disk 12 and, thus, the length of the through holes 30, 31, 32 is about 6 mm, the through holes should have a diameter of about 0.5 mm to 1 mm, which is shown exaggerated in the drawings for the sake of clarity.

Various methods are known by which firmly adhering nickel coatings can be deposited on the surface of ceramic parts. Since the disks 11, 12 are made of alumina, a method is used by which a pure nickel coating can be applied directly to the surface of alumina parts by electroless deposition. Such a method is described, for example, in the journal "Metal Finishing", Vol. 86, No. 3, Mar. 1988, pages 31/32.

Compared to the other metals and alloys commonly used for producing coatings by electroless deposition, the use of pure nickel for the coatings 16, 18 has significant advantages:

1. Pure nickel has a high melting point of 1450° C. and, therefore, allows brazing at considerably higher temperatures than, e.g., the commonly deposited nickel phosphorus coatings, which have a melting point of only about 700° C. if the phosphorus content is 10%.

2. After brazing at a temperature of about 800° C. to 1000° C., the pure nickel coatings still adhere very firmly to alumina ceramic, in contrast with copper coatings, for example, which lose their adhesion to alumina ceramic after being heated to a temperature above about 400° C.

3 16 . The solubility of nickel in liquid solder is very low.

1 4. Pure nickel is very well suited for patterning by photolithographic techniques.

FIG. 4 shows the two disks 11, 12 after the nickel deposition. As in the other figures, the thickness of the nickel coatings 16, 18 is shown exaggerated for the sake of clarity; in reality, it is about 5 $\mu$m to 20 $\mu$m. The nickel coatings cover all surfaces of the two disks 11, 12 and the wall surfaces of the through holes 30, 31, 32. It should be noted that with the aspect ratio given above, uniform coating inside the through holes is possible only by electroless deposition. With electrodeposition, no uniform potential distribution can be achieved in the through holes.

Figure 5:
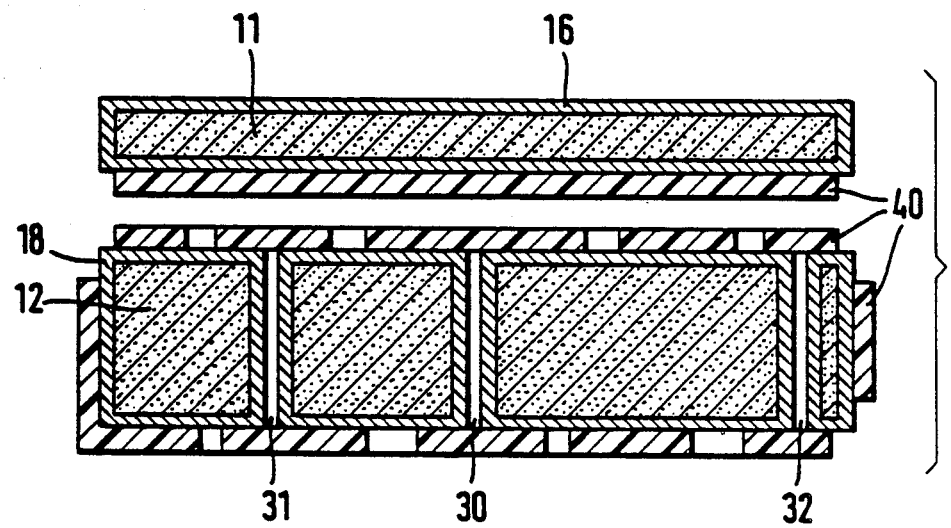

Next, the nickel coatings 16, 18 are patterned. This is preferably done using photolithographic techniques as are commonly employed in the fabrication of microelectronic circuits. The surfaces of the nickel coatings 16, 18 are covered with a light-sensitive etch resist ("photoresist") which is then exposed through a mask and subsequently developed. Through the development, the exposed portions of the resist layer are hardened, for example, and the unexposed portions of the resist layer can then be removed. FIG. 5 shows the disks 11, 12 with the exposed and developed resist layers 40 after removal of the unexposed portions. As can be seen, all portions of the nickel coatings 16, 18 which are to be left are covered by the resist layers 40, while all portions which are to be removed are uncovered.

The uncovered portions of the nickel coatings 16, 18 are removed by etching. A suitable etchant for nickel is iron (III) chloride ($FeCl_3$) or nitric acid. After the uncovered portions of the nickel coatings have been etched away, the resist layers are removed.

Before the two disks 11, 12 are soldered together, the nickel coating 16 is covered with a solder resist 41 except in the annular edge region 42 to be soldered. The solder resist layer 41 is formed, for example, by sputtering on silicon dioxide ($SiO_2$) with a thickness of 0.5 $\mu$m.

Figure 6:
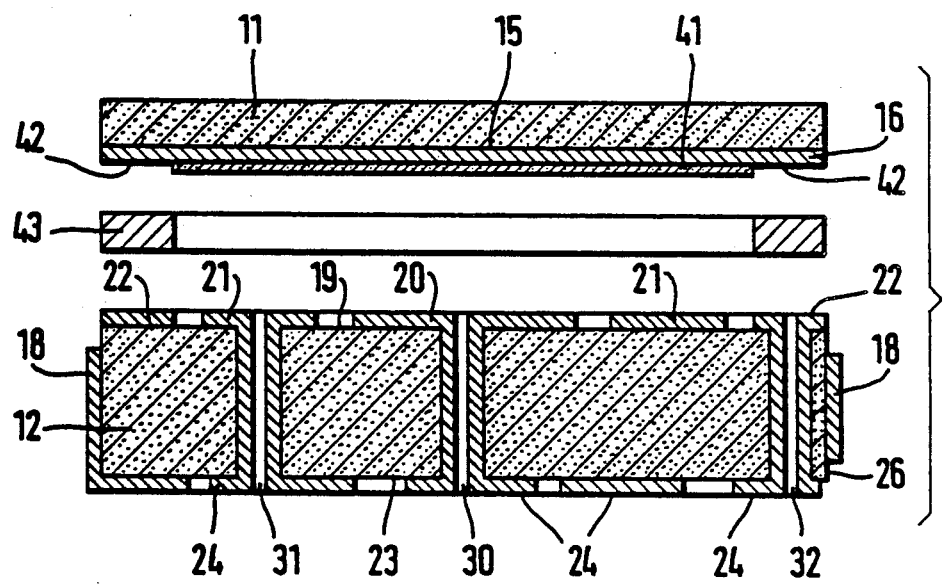

The two disks 11, 12 are then placed one on top of the other, with an annular formed part 43 of solder metal being inserted between the edge portions 22, 42 of the nickel coatings 18, 16 (FIG. 6). The two disks 11, 12, together with the interposed formed part 43 of solder metal, are introduced into a high vacuum or an inert atmosphere and heated therein to a temperature above the melting temperature of the solder metal. The solder resist layer 41 prevents the solder metal from flowing over the surface of the nickel coating 16. After cooling down, the two disks of the pressure sensor are permanently joined together. The permanent joint is mainly due to the high adhesion of the nickel coating on the alumina ceramic, which is greater than the strength of the alumina ceramic itself. This results in a high tensile and shear strength of the diaphragm mounting and in a very low tendency to creep. Furthermore, the joint has a high thermal stability and practically a zero hysteresis.

With regard to the properties of the pressure sensor, the use of pure nickel for the coating 16 for the diaphragm electrode has further advantages in that the coating has 1. no or only low residual stresses,
2. low flexural rigidity, and
3. high elasticity and ductility.

Especially because of the two first-mentioned properties, the action of the nickel coating 16 on the diaphragm 11 is negligible.

As can be seen, the solder resist layer 41 remains in the finished pressure sensor. This does not impair the properties of the pressure sensor in any way; on the contrary, in certain cases, the solder resist layer 41 offers additional advantages. If, for example, the pressure sensor is designed as a relative-pressure sensor in which the chamber 14 communicates with a surrounding gas atmosphere, moisture may penetrate into the chamber 14 and condense there. In that case, the solder resist layer 41 also serves as an anticorrosive layer which prevents the nickel coating 16 from being corroded.

We claim:

1. Capacitive pressure sensor (10) comprising two disks (11, 12) of alumina ceramic
    which are joined together around the periphery in a defined spaced relationship and parallel to each other, forming a sealed chamber (14);
    of which at least one (11) is designed as an elastic diaphragm;
    of which at least one (12) supports one or more capacitor electrodes (17, 20, 21) inside the chamber (14) on the surface facing the other disk (11);
    the surface of each of which is covered with a firmly adhering, pure nickel coating (16, 18) which is applied by electroless deposition from an aqueous solution and in which the capacitor electrodes (17, 20, 21) are formed by patterning;
    which are joined together around the periphery by a solder metal (13) which bonds the nickel coatings (16, 18) together, and
    one (12) of which has at least two through holes (30, 31, 32) whose walls are also covered with the nickel coating, whereby the capacitor electrodes are connected to an electronic circuit disposed outside the chamber.

2. A pressure sensor as claimed in claim 1 wherein at least one (32) of the nickel-plated holes is electrically connected via the solder metal (13) to a capacitor electrode (16) supported by the other disk.

3. A pressure sensor as claimed in claim 1 or 2 wherein on the surface of one of the two disks (12) facing away from the chamber (14), conductor tracks (24) are formed by patterning the nickel coating (18).

4. Method of manufacturing a pressure sensor wherein
    two disks (11, 12) are made from alumina ceramic, at least one of them being designed as an elastic diaphragm;
    through holes (30, 31, 32) are formed in at least one of the two disks;

a firmly adhering pure nickel coating (16, 18) is applied to the surface of each of the disks (11, 12) and to the walls of the through holes by electroless deposition from an aqueous solution;

the nickel coatings are patterned to form capacitor electrodes (17, 20, 21) and/or conductor tracks (24);

the two disks (11, 12) are placed one on top of the other, with a formed part of solder metal (13) being inserted between peripheral portions of the nickel coatings (16, 18), and the assembly is heated until the solder metal melts.

5. A method as claimed in claim 4 wherein those surface portions of a nickel coating which are linked with the peripheral portion to be soldered but are not to be soldered are covered with a solder resist (41) prior to the soldering operation.

6. A method as claimed in claim 5 wherein the solder resist (41) is made of silicon dioxide.

7. A method as claimed in any one of claims 4 to 6 wherein a patterned etch resist layer is deposited for patterning the nickel coatings;

the parts of the nickel coatings not covered by the etch resist layer are etched away, and the etch resist layer is then removed.

8. A method as claimed in claim 7 wherein the etch resist layer is formed using photolithographic techniques.

* * * * *